May 19, 1953 — R. M. SALTER, JR — 2,638,738
RAMJET ENGINE HAVING INLET CONE DIFFUSER AUTOMATICALLY
ADJUSTABLE AS TO LENGTH AND CONE ANGLE
Filed March 22, 1951 — 2 Sheets-Sheet 1
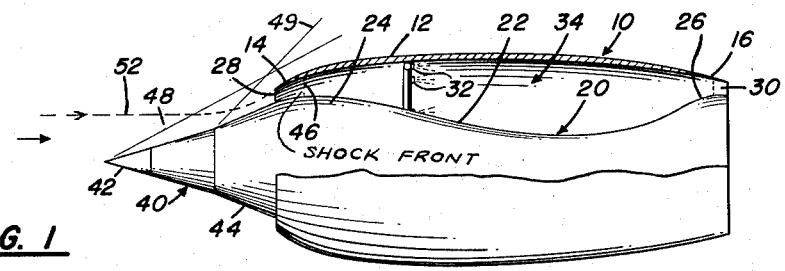
FIG. 1
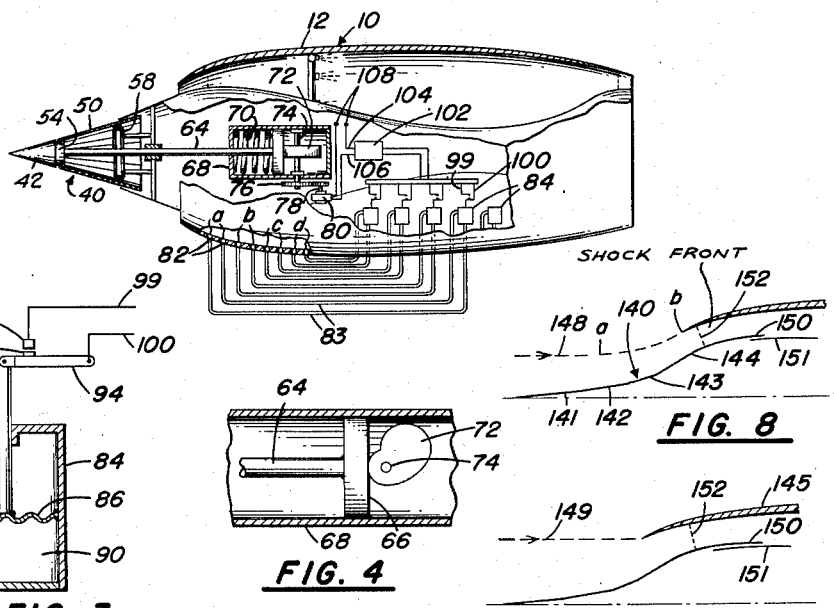
FIG. 2
FIG. 3
FIG. 4
FIG. 8
FIG. 9
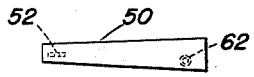
FIG. 5
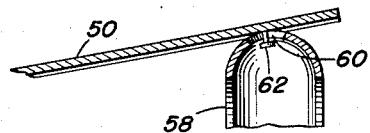
FIG. 7
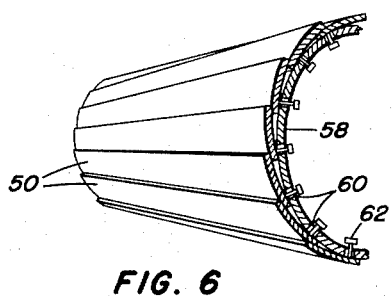
FIG. 6
INVENTOR.
ROBERT M. SALTER, JR.
BY
ATTORNEYS May 19, 1953            R. M. SALTER, JR            2,638,738
RAMJET ENGINE HAVING INLET CONE DIFFUSER AUTOMATICALLY
ADJUSTABLE AS TO LENGTH AND CONE ANGLE
Filed March 22, 1951                                2 Sheets-Sheet 2

INVENTORS
ROBERT M. SALTER, JR.

BY

ATTORNEYS

Patented May 19, 1953

2,638,738

UNITED STATES PATENT OFFICE 2,638,738

RAMJET ENGINE HAVING INLET CONE DIFFUSER AUTOMATICALLY ADJUSTABLE AS TO LENGTH AND CONE ANGLE

Robert M. Salter, Jr., Santa Monica, Calif.

Application March 22, 1951, Serial No. 217,042

6 Claims. (Cl. 60—35.6)

(Granted under Title 35, U. S. Code (1952), sec. 266)

This invention relates to air diffusers for ram-jet propulsion engines operable at supersonic velocities.

In ram-jet engines, efficiency of operation is dependent on several factors one of the most important of which is high static recovery value over free stream static pressure at supersonic speeds. When air travelling at supersonic velocities is brought into a chamber and expanded to transform velocity energy into pressure energy, a normal shock wave or front is set up whereby the air, upstream from the shock wave, is travelling at speeds greater than the local speed of sound and the air, downstream from the shock wave, is travelling at speeds lower than the local speed of sound. If all the velocity energy of the supersonic air, at a Mach number, for example, of 2.9, could be converted into pressure energy isentropically, a static pressure recovery of about 31 ratios by "ratios" meaning the ratio of the chamber pressure to that of the external ambient pressure is possible. However, the recovery in ordinary ram-jet construction would be much lower than this maximum value, a ratio of about eleven being likely for a Mach number of 2.9.

The Oswatitsch ram-jet diffuser as described, for example, in High Speed Aerodynamics, by W. F. Hilton (Longmans, Green and Co., 1951), improves the ordinary ratio to a value around nineteen. In this diffuser, a spike is employed at the nose axis air inlet; and this spike has two conical slopes of different angle, that is, a peak cone and a base cone of less acute slope. As a result two oblique shock fronts are created ahead of the normal shock front and the air velocity is changed at these fronts from a higher to a lower supersonic velocity. While the pressure recovery ratio is thus improved, the spike is fixed and hence the efficiency of operation is dependent on jet movement at a velocity compatible with the spike angles of slope.

One of the important objects of this invention is to provide a ram-jet diffuser which provides a dual shock front diffusion and which at the same time automatically accommodates itself to jet speeds. Another object is to provide a ram-jet cone diffuser which is susceptible to modification automatically, both as to length and to cone angle. Still another object is to provide effective mechanism for changing the cone placement and form without disturbing materially the aerodynamic contour of the jet.

Other objects and features of the invention will be apparent on consideration of the detailed construction of an embodiment of the same, taken in conjunction with the drawings, in which:

Fig. 1 is a diagrammatic part sectional view of a ram-jet engine indicating the dual air shock fronts;

Fig. 2 is a longitudinal part sectional view showing a form of operating mechanism;

Fig. 3 is a detail sectional view of a pressure switch;

Fig. 4 is a detail of the cam unit;

Fig. 5 is a detail of the spike ribs;

Figs. 6 and 7 show details of the rib slide connections;

Figs. 8 and 9 show details of a modification;

Figure 10:
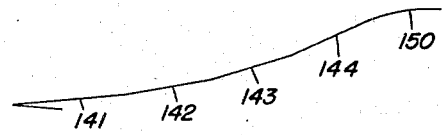
Fig. 10 is an enlarged view of the spike of Figs. 8 and 9 showing the four angled longitudinal contour thereof.

Referring to Fig. 1 there is shown a ram-jet engine 10 having an enshrouding cylindrical casing 12 provided with sharpened converging end edges 14 and 16. The enclosed ram-jet body 20 is contoured with a somewhat constricted inner section 22 and enlarged end sections 24 and 26, these end sections defining respectively the inlet 28 and outlet 30 of the jet engine. Fuel nozzles 32 are placed circumferentially about the inner surface of the enclosing casing 12 at points within the expanded space 34 between the jet body 20 and the casing 12.

Projecting forwardly from the leading inlet end 28 of jet body 20 is the dual cone spike 40 of the type developed by Oswatitsch for projectiles travelling at supersonic velocities. This spike is in two coaxial sections of conical form, the tip section 42 having a more acute angle with reference to the common cone axis than the base cone 44. As above mentioned these two conical surfaces serve to develop two shock fronts ahead of the normal shock front. On reference to Fig. 1 the normal shock front is indicated at 46 and the leading supersonic shock fronts due respectively to the tip and base cones 42 and 44 are indicated by straight lines 48 and 49. The air stream movement is indicated by the dotted line 52.

Passing the normal shock front at 46 the velocity energy is transformed to pressure energy at subsonic velocities and heat is added through injection of fuel by nozzles 32, the heated burning gas being ejected at high velocity through the discharge nozzle 30. The ejection of the heated gas at the nozzle outlet 30 provides the thrust for propulsion.

Reference is now made to Fig. 2 for a disclosure of mechanism for accommodating the spike form to the speed of movement of the jet.

Figure 11:
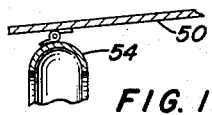
Fig. 11 is a detail view of the front end of one of the spike ribs showing the pivot connection to the supporting ring.

The spike unit 40 is constructed so that the tip cone 42 may be moved relative to the base cone 44. This movement is two fold, axially so as to produce a linear displacement between the two cone sections, and transversely to the axis so as to modify the tip cone angle relative to the axis. This latter change is made possible by constructing the tip cone 42 of a series of similar overlapping triangular strips or ribs 50 which are fastened at their small ends 52 to a collar 54 about the extreme end of the spike 40. The small rib end attachment is pivotal so that the rib may swing outwardly only from the shaft 64, as shown in Fig. 11.

The ribs 50 are slidingly supported at their large ends by the ring 58. This ring is attached to base cone 44 and is slotted on its outer surface by a series of parallel slots 60 aligned generally with the spike ends. There is one slot for each rib and the slot is adapted to receive a slide member 62 secured to and depending from each rib so that the rib may move axially but is restrained from lateral movement. The rib construction and arrangement is shown in Figs. 5, 6 and 7.

Secured to the collar 54 is a rod 64 which extends axially of the jet body and terminates in a solid piston head 66. This head is slidable in a fixed cylindrical casing 68 and is normally urged inwardly from the tip by coil spring 70. On the inward side of the head 66 within the casing is a cam 72 supported by shaft 74 extending parallel to the outer head surface. The shaft 74 extends outwardly from casing 68 and terminates in a gear train 76 leading to the shaft 78 of electric motor 80. It is now apparent that by rotation of motor shaft 78 the cam is rotated to move the rib head 66 forwardly, for example, and thereby the floating ribs toward the shaft 64. Since the ribs are constrained from transverse movement, each rib pivots on its sliding attachment and assumes a varying angle in relation to the axis of shaft 64, that is the tip cone angle becomes more acute. Conversely, when the cam 72 is reversed in direction of rotation, air pressure due to engine movement combined with action of spring 70 force the head 66 rearwardly thereby increasing the rib angle with reference to shaft 64. In this manner both tip cone angle is varied and the tip cone is displaced axially with reference to the base cone.

In order to obtain an automatic adjustment of the tip cone 42 to match the jet plane speed and thereby secure optimum efficiency in operation, it is proposed to utilize the pressure change in the air line of the jet across the normal shock front as indicated by numeral 46. This pressure change is due to entropy changes through the normal shock front and the location along the axial direction of the jet is found to be a function of speed. Accordingly, by use of Pitot-static pressure taps positioned along the cowling 12 or inner body 20 of the jet, it is possible to secure an abrupt pressure change between two taps which are just ahead and behind the shock front; and this pressure change may be utlized to control the electric motor 80 and connected cam 72 to adjust the tip cone 42.

While various convential servo-mechanisms using either hydraulic, pneumatic or electrical controls, or combination of the same, may be used, Fig. 2 illustrates an arrangement in which use is made of a combination of pneumatic and electrical control devices. The axially displaced Pitot tube taps are indicated at 82. Each of these taps are connected by tubes 83 to a group of small drums 84, pairs of adjacent taps, beginning with leading pair and lettered respectively a, b, c, d, etc., being connected to a single drum. On reference to Fig. 3, it is apparent that the drum is hollow and divided by an impervious flexible diaphragm 86 into two chambers 88 and 90. Taking pair a for example one of the tubes connects to chamber 88 and the other to chamber 90; and when a pressure change exists across the Pitot tubes due to proximity of a shock wave front this pressure is effective in the drum 84 and the diaphragm flexes.

Connected to diaphragm 86 is a pin 92 extending outwardly through an air tight bearing in the drum wall. The pin is pivotally connected at its end to a movable contact member 94 bearing an electrical contact 96, which in turn, is adapted to engage a fixed contact 98 when the diaphragm 86 is flexed outwardly as indicated in Fig. 2. Leading from contacts 96 and 98 are wires 99 and 100 which connect the switch to a combined timer and motor reversal unit 102. This unit utilizes timing mechanism for stopping the motor at the cam position found by experiment or calculation to give the most efficient tip cone angle; and also provides reversal mechanism for changing the motor direction when the shock front shifts forwardly, as from tube pair c to b. From the timer-reversal unit 102 wires 104 and 106 lead to the electric motor 80 and the power terminals 108.

Figure 12:
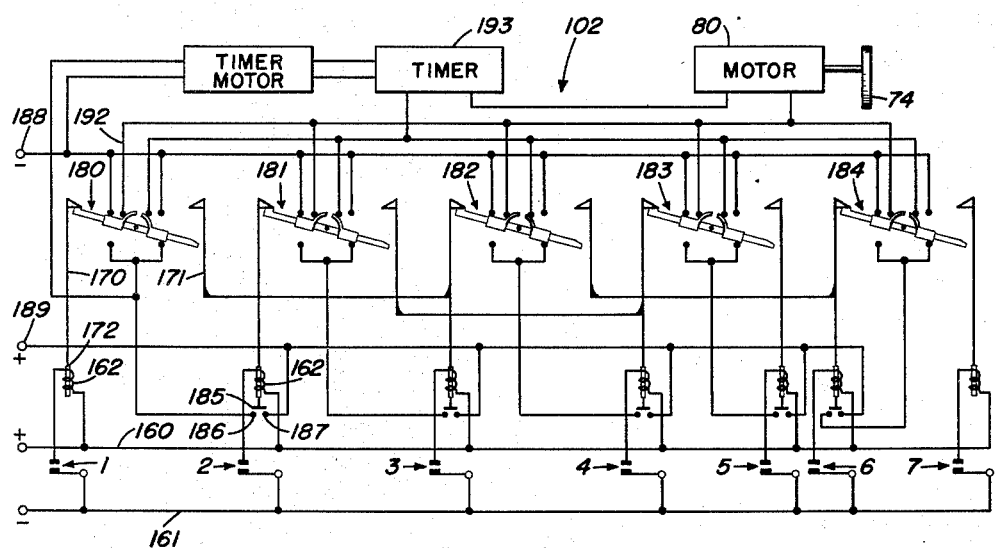
Fig. 12 is a schematic view showing details of the timing and reversing unit.

The timer and motor reversing unit 102 involves old and conventional ideas not considered a part of this invention. The timer, for example, may be of the type shown in Patent No. 2,175,865 issued to Carl L. Anderson and dated October 10, 1939, and contemplates passing current to the cam motor 80 for a fixed time at each closure of the shock front actuated switches thereby to secure a longitudinal movement of the spike. To obtain reversal of current through the cam motor it is necessary to employ a reversing switch such as the well-known spring reversing switch; and, by way of example, an operative switch device is shown in Fig. 13, Fig. 12 showing the switch connection for a series of seven shock front switches.

Referring to these figures, the shock front switches are designated by numerals 1, 2, 3, 4, 5, 6 and 7 respectively. These switches are connected in parallel to power lines 160 and 161, one switch terminal being directly connected and the other connected through coil magnets 162.

Figure 13:
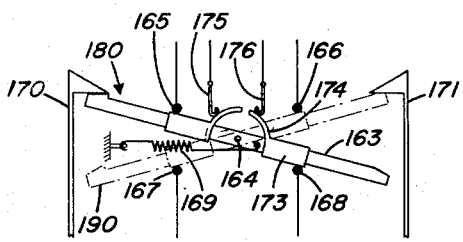
Fig. 13 is a detail view of a reversing element.

The reversing switch, shown more clearly in Fig. 13, consists in a switch bar 163 movable on pivot 164 between circuit terminals 165, 166, 167 and 168, a spring 169 connected between a stationary point off the pivot 164 and a point on the bar displaced from its center, serving to hold the bar at one or the other limit of pivotal movement. Tripping elements 170 and 171, integral with magnet cores 172 and movable in coil magnets 162 serve to displace the switch bar 163 from one limit to the other.

The bar 163 is provided with a contact element on each side of the bar pivot consisting in a metal tube 173 surrounding and insulated from the bar and a wipe contact tongue 174 integral with the tube and projecting outwardly on the top side of the bar as shown in Fig. 13, wipe contacts 175 and 176 having continuous engagement with these tongues irrespective of the bar positions. There are provided five of these reversing switches assembled as shown in Fig. 12 and designated 180, 181, 182, 183 and 184 respectively. It is noted that cores 172 of shock front switch units 2, 3, 4, 5 and 6 are provided with terminal contact plates 185 for bridging circuit contacts 186 and 187. Power line terminals are indicated at 188 and 189.

The circuit operation may now be described: Assume the jet speed as below that of actuation of switch 1 and increasing to actuation point, and assume also the reversing switches all inclined as indicated in Fig. 12. Closure of switch 1, energizes the associated coil magnet 162 and trips the bar switch to the reverse position indicated by broken line 190 in Fig. 13. In this position no current flows from the power lines but switch 180 is conditioned for supply of power to the timer and cam motor for rearward movement of the spike 40. When the shock front actuates switch 2 current flows from terminal 189 through magnet switch contacts 186, 187, to terminals 167 and 168 of reversing switch 180 which are connected together. From this point the current flows through the wipe contact to conductor 192 through cam motor 80, timer element 193 back to power terminal 188 and at the same time power is supplied the timer motor to operate the timer element for a set period.

The movement of armature 172 in switch unit 2 also trips bar reversing switch 181 to the new position of switch 180. Consequently when switch 3 is actuated and the core switch of this unit closed, power will be supplied to the cam motor and timer for a new set period. At the same time the core 172 of the 3 coil magnet sets switch bar 182 to the new position and restores bar 180 to the original position.

Should the jet speed decrease and switch 2 be again closed, current will pass through the bar 180 into the reverse direction to reverse the cam-motor, thus moving the spike a single unit, in reverse direction. Note is made that as the shock front pressure changes each switch 1, 2, 3, etc., is closed and then opened so that there is no simultaneous closures. In this way the spike is moved forward or backward in accordance with speed.

The operation of the apparatus has been indicated but a review thereof may be useful. The ram-jet is assumed operating at supersonic speed resulting in the formation in the internal air stream of a normal shock front, as in the region between the Pitot tubes of pair $a$. An abrupt pressure change between these tubes results, flexing diaphragm 86 on drum 83 and closing electrical contacts 96 and 98. Thereupon, the timing mechanism is operated and the motor rotates the cam a segment of revolution as set by the timer, thus axially shifting the spike cone 42 to the point of optimum efficiency for this particular jet speed.

On change of jet speed, with shift of the shock front to point $b$, for example, the diaphragm of the next adjacent drum is actuated to set in motion the timer mechanism together with the electric motor and cam. A change of the speed causing a shift forward of the shock front will bring about a motor reversal, in addition to the timer and motor functions.

Figs. 8 and 9 illustrate a modification of the invention wherein shock front variation in the diffuser is secured by shift of the entire spike 140 with its multiple conical frustum slopes 141, 142, 143 and 144, axially with reference to the axis of cowling 145.

Fig. 8 indicates the extended spike position and Fig. 9 the retracted position, numerals 150 and 151 of Figs. 8 and 9 indicating the overlapping spike and connecting support casings, respectively, and numeral 152 indicating the normal shock front of the airflow. This type of diffuser control has advantages in construction and uses, and while the pressure recovery is not as much as that of the diffuser of Fig. 2 it is sufficient to justify use in ramjet construction. A special advantage of the modified diffuser is an increase in mass airflow into the engine and a decrease of overall drag, as in the diffuser position of Fig. 8, through elimination of "stream-line" drag. This stream-line drag develops in the stream-line contour 148 of Fig. 8 along section $a$—$b$ at lower Mach number speeds, this contour being absent from contour 149 of Fig. 9.

For still other uses the spike controls of Figs. 2 and 8 may be combined, thus realizing advantages of both forms.

While the structure described is illustrative of an operative mode of carrying out the invention it is understood that the mechanisms employed are subject to considerable change both in structure and use. For example, while the invention has been described with reference to spike contour control, it is also usable as controls of fuel flow, fuel disposition, and points of fuel injection. Further, while two and four oblique slopes of the spike are shown in Figs. 2 and 8 respectively, obviously any number over two may be used; and the greater the number of slopes (and shock fronts) the greater the desirability of having operating conditions near design, as accomplished by the described apparatus. Also, while for illustrative purposes the invention is described as applied to ramjets the diffuser works equally well on turbo-jets operating in the same speed range. In view of these varied uses and arrangements no limitation is intended by the precise arrangements disclosed other than may be required by the scope of the claims as hereto appended.

The invention described herein may be manufactured and used by or for the Government of the United States of America for governmental purposes without the payment of any royalties thereon or therefor.

What is claimed is:

1. A ram-jet engine comprising an outer tubular cowling, an elongated body enclosed by said cowling and forming therewith an air-fuel stream chamber, a fuel supply for said chamber, inlet and outlet nozzle constrictions at opposite ends of said chamber, a spike positioned forward of said body axially thereof and having a conical air diffuser therein, and means for modifying the cone angle relative to the cone axis while said engine is in forward motion, said diffuser having a wall with ribs pivoted at the forward ends to said spike and slidable at the rearward ends on a support fixed to said body, and said cone angle modifying means including a reversible motor, gear mechanism between said motor and spike for moving said spike and thereby said ribs axially whereby said ribs are caused to ride over said rearward support and modify the diffuser cone angle.

2. A ram-jet engine comprising an outer tubular cowling, an elongated body enclosed by said cowling and forming therewith an air-fuel stream chamber, a fuel supply for said chamber, inlet and outlet nozzle constrictions at opposite ends of said chamber, a spike positioned forward of said body axially thereof and having a conical air diffuser therein, and automatic means for increasing the cone angle relative to the cone axis in accordance with increase in velocity of gas flow through said air-fuel chamber, said diffuser having a wall with ribs pivoted at the forward ends to said spike and slidable at the rearward ends on a support fixed to said body, and said cone angle modifying means including a motor, gear mechanism between said motor and spike for moving said spike and thereby said ribs axially whereby said ribs are caused to ride over said rearward support and modify the diffuser cone angle, air pressure switches each actuated at a pressure corresponding to a different air speed mounted on said engine body, and timing means connected between said switches and motor for limiting the time period of motor movement for each switch actuation.

3. A ram-jet engine comprising an outer tubular cowling, an elongated body enclosed by said cowling and forming therewith an air-fuel stream chamber, a fuel supply for said chamber, inlet and outlet nozzle constrictions at opposite ends of said chamber, an air diffusing spike forward of said body, and automatic means for modifying the spike contour in accordance with shift in position of the normal shock front of air inside said air-fuel chamber, while said engine is in forward motion, said diffuser having a wall with ribs pivoted at the forward ends to said spike and slidable at the rearward ends on a support fixed to said body, and said cone angle modifying means including a motor, gear mechanisms between said motor and spike for moving said spike and thereby said ribs axially whereby said ribs are caused to ride over said rearward support and modify the diffuser cone angle, air pressure drums open to the air stream chamber of said engine and subject to the movement of the normal air shock front in said chamber whereby successive drums are compressed with change of engine speed, switch means connected to each of said pressure drums, and timing means connected between said switch means and said motor for limiting the time period of motor movement for each switch actuation, whereby successive shock front actuation of said switch means front to rear produces successive increments in spike diffuser angle relative to the spike axis.

4. A ram-jet engine comprising an outer tubular cowling, an elongated body enclosed by said cowling and forming therewith an air-fuel stream chamber, a fuel supply for said chamber, inlet and outlet nozzle constrictions at opposite ends of said chamber, an air diffusing spike forward of said body and formed of two coaxial cones of different angularity with reference to the cone axis and mounted one in extension of the other to form a continuous axially extending surface, one of said cones having overlapping ribs extending generally in the direction of cone slant and pivoted on said spike at the reduced cone end to permit variation in cone slant by outward pivotal movement of said ribs means for moving said ribs to vary said extensible conical surface contour, and means for controlling said moving means in accordance with the speed of bodily movement of said engine said rib moving means comprising a slide ring secured to said body and on which said ribs have sliding movement, a cam head, a rod connecting said spike and cam head, a cam for moving said cam head, and motor means for actuating said cam to move said spike and thereby to obtain variation in the rib angle with the cone axis.

5. A variable diffuser for ram-jet engines including an outer casing and inner contouring body forming with said casing inlet and outlet nozzles and a combustion chamber comprising a slidable shaft adapted for placement at the forward end of the engine in alignment with the engine axis and line of bodily movement, an annular support at the forward end of said shaft and connected thereto, a fixed annular support surrounding said shaft rearwardly from said forward annular support and fixedly connected to said engine body, a plurality of side-edge overlapping ribs pivoted for outward movement on said forward support in a direction perpendicular to said shaft and adapted for slidable contact with said fixed rearward support, means for restraining free outer movement of said ribs, and power means for imparting axial movement to said shaft.

6. A jet type engine comprising an outer tubular cowling having a forward lip, an elongated body enclosed by said cowling and forming therewith an air-fuel stream chamber, a fuel supply for said chamber, an inlet nozzle constriction at the forward end of said chamber, an air diffusing spike supported by said enclosed body forwardly of and in axial alignment with said cowling provided with sections having plural diverse conical slopes thereon, at least one section of said spike being movable relative to the other spike sections and to the cowling lip and means for moving said movable section.

ROBERT M. SALTER, Jr.

References Cited in the file of this patent

UNITED STATES PATENTS

| Number | Name | Date |
|---|---|---|
| 2,540,594 | Price | Feb. 6, 1951 |
| 2,570,629 | Anxionnaz et al. | Oct. 9, 1951 |

FOREIGN PATENTS

| Number | Country | Date |
|---|---|---|
| 50,033 | France | Aug. 1, 1939 |
| | (3rd addition to No. 779,655) | |